US009062757B2

(12) United States Patent
Moon et al.

(10) Patent No.: US 9,062,757 B2
(45) Date of Patent: Jun. 23, 2015

(54) AUTOMOTIVE TRANSMISSION

(71) Applicant: SL Corporation, Daegu (KR)

(72) Inventors: Sang Ho Moon, Gyeonsangbuk-Do (KR); Yun Je Hwang, Gyeonsangbuk-Do (KR)

(73) Assignee: SL CORPORATION, Daegu (KR)

( * ) Notice: Subject to any disclaimer, the term of this patent is extended or adjusted under 35 U.S.C. 154(b) by 0 days.

(21) Appl. No.: 14/019,215

(22) Filed: Sep. 5, 2013

(65) Prior Publication Data

US 2014/0165764 A1    Jun. 19, 2014

(30) Foreign Application Priority Data

Dec. 14, 2012    (KR) .................. 10-2012-0146538

(51) Int. Cl.
    *F16H 59/10*    (2006.01)
(52) U.S. Cl.
    CPC ........... *F16H 59/10* (2013.01); *Y10T 74/20085* (2015.01)
(58) Field of Classification Search
    CPC ................ F16H 59/0204; F16H 59/12; F16H 2061/242; F16H 2061/243
    USPC ................. 74/473.18, 473.21, 473.22, 483 R
    See application file for complete search history.

(56) References Cited

U.S. PATENT DOCUMENTS

| | | | | |
|---|---|---|---|---|
| 5,309,783 A * | 5/1994 | Doolittle et al. | ........... | 74/473.21 |
| 5,593,011 A * | 1/1997 | Harada | ....... | 192/220.4 |
| 6,701,798 B2 * | 3/2004 | Meyer | ........ | 74/473.21 |
| 6,895,833 B2 * | 5/2005 | Cho | ........... | 74/473.18 |
| 6,966,237 B2 * | 11/2005 | Scheib et al. | ............. | 74/473.12 |
| 7,213,483 B2 * | 5/2007 | Inoguchi et al. | ........... | 74/473.23 |
| 7,406,893 B2 * | 8/2008 | Sakon et al. | ............. | 74/473.22 |
| 7,650,812 B2 * | 1/2010 | Tomida | ...... | 74/473.13 |
| 8,347,752 B2 * | 1/2013 | Weifels | ....... | 74/473.21 |
| 8,371,188 B2 * | 2/2013 | Bortolon et al. | .......... | 74/473.21 |
| 2003/0074999 A1 * | 4/2003 | Shioji et al. | ................ | 74/473.21 |
| 2008/0006112 A1 * | 1/2008 | Mitteer | ........ | 74/473.1 |
| 2008/0006115 A1 * | 1/2008 | Mitteer | ...... | 74/473.21 |
| 2008/0072698 A1 * | 3/2008 | Hirano | ....... | 74/473.21 |
| 2010/0107799 A1 * | 5/2010 | Sickart | ....... | 74/473.21 |
| 2011/0036193 A1 * | 2/2011 | Ueta et al. | ................. | 74/473.21 |

FOREIGN PATENT DOCUMENTS

| | | |
|---|---|---|
| JP | 3132982 B2 | 2/2001 |
| KR | 10-0259649 B1 | 8/2000 |

* cited by examiner

*Primary Examiner* — William Kelleher
*Assistant Examiner* — Zakaria Elahmadi
(74) *Attorney, Agent, or Firm* — Mintz Levin Cohn Ferris Glovsky and Popeo, P.C.; Kongsik Kim; Carolina E. Säve

(57) ABSTRACT

An automotive transmission is provided that includes a shift lever configured to move in a first direction to select a gear shifting position and a moving member that is configured to move in a second direction along a guide groove formed in the shift lever. A movement blocker is configured to selectively block the movement of the shift lever based on a position of the moving member. The movement blocker includes a rotating member configured to rotate in one direction by the moving member positioned at one side of the guide groove and block the movement of the moving member in the first direction. In addition, a support member to which the rotating member is rotatably connected moves in the second direction by the moving member positioned at the other side of the guide groove.

10 Claims, 15 Drawing Sheets

AUTOMOTIVE TRANSMISSION

CROSS-REFERENCE TO RELATED APPLICATION

This application claims priority from Korean Patent Application No. 10-2012-0146538 filed on Dec. 14, 2012, the contents of which in its entirety are herein incorporated by reference.

BACKGROUND

The present invention relates to an automotive transmission, and more particularly, to an automotive transmission that supports two or more gear shifting modes and performs conversion between the gear shifting modes.

An automotive transmission may change a gear ratio to maintain revolutions of an engine to be constant with a speed of a vehicle, and the driver may manipulate a shift lever disposed in a transmission to change the gear ratio of the transmission. For the gear shifting mode of the automotive transmission, there is a manual gear shifting mode in which the driver may change a gear shifting position, and an automatic gear shifting mode in which the gear shifting position is automatically based on the speed when the driver selects a driving mode (D).

With the above gear shifting modes, a sports mode type transmission is used in which the manual gear shifting and the automatic gear shifting may be performed in a single transmission. In the sports mode type transmission, the driver may perform the manual gear shifting by raising or lowering positions of gears while performing the automatic gear shifting, or the gear shifting using a transmission which may perform the automatic gear shifting and is disposed adjacent to a transmission that performs the manual gear shifting.

The automotive transmission has a shift lock function called a gear shifting lock function. The shift lock function has been developed to prevent a frequent sudden acceleration accident, and, there is a primary shift lock function that prevents the shift lever from being moved to other positions when the driver does engage a brake pedal when the gear shifting position of the shift lever is in a parking position (P-position) or a neutral position (N-position), and a secondary shift lock function that prevents the shift lever from being moved to a reverse position (R-position) when a vehicle travels in a forward direction at a predetermined speed or more. Further, to prevent an erroneous operation of the driver, a full shift lock function that allows the shift lock with respect to the gear shifting positions may be implemented.

Meanwhile, in the automotive transmission that supports two or more gear shifting modes, the designated gear shifting position must be selected to convert the gear shifting mode, and a gear shifting position is formed in any one of the two or more gear shifting modes to select another gear shifting mode. However, since the gear shifting position for converting one gear shifting mode to another gear shifting mode may be selected due to an erroneous operation of the driver.

SUMMARY

The present invention provides an automotive transmission that prevents a gear shifting position for converting gear shifting modes from being selected due to an erroneous operation of a driver, and stably converts the gear shifting mode in the automotive transmission that supports two or more gear shifting modes.

An exemplary embodiment of the present invention provides an automotive transmission that may include a shift lever configured to move in a first direction to select a gear shifting position, a moving member configured to move in a second direction along a guide groove formed in the shift lever, and a movement blocker configured to selectively block the movement of the shift lever based on a position of the moving member, in which the movement blocker may include a rotating member configured to rotate in one direction by the moving member positioned at one side of the guide groove and block the movement of the moving member in the first direction, and a support member to which the rotating member is rotatably connected and which moves in the second direction by the moving member positioned at the other side of the guide groove.

According to the automotive transmission of the present invention, as described above, there are one or more effects as follows. First, the movement of the shift lever may be selectively blocked when the gear shifting mode is selected from one gear shifting mode to another gear shifting mode in the automotive transmission that supports two or more gear shifting modes, thereby preventing the gear shifting position for converting the gear shifting mode from being selected due to an erroneous operation of the driver, and preventing a possibility of a vehicle accident.

The effects of the present invention are not limited to the aforementioned effects, and other effects, which are not mentioned above, will be apparently understood by the person skilled in the art from the recitations of the claims.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION

Figure 1:
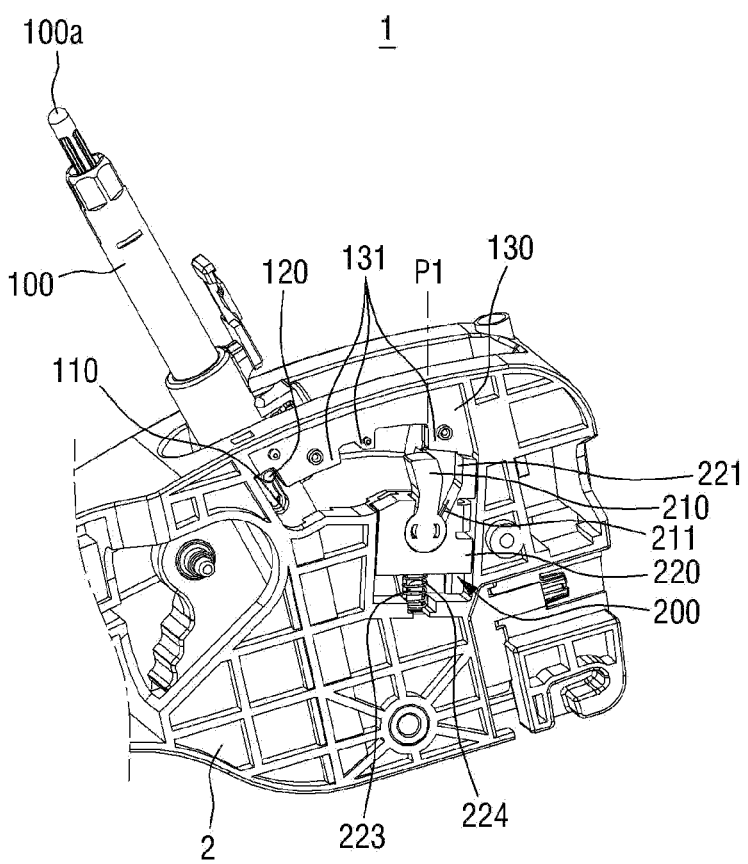
FIG. 1 is an exemplary view illustrating an automotive transmission according an exemplary embodiment of the present invention.

Advantages and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Embodiments are described herein with reference to cross-section illustrations that are schematic illustrations of exemplary embodiments (and intermediate structures). As such, variations from the shapes of the illustrations as a result, for example, of manufacturing techniques and/or tolerances, are to be expected. Thus, these exemplary embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Herein, the present invention will be described with reference to the drawings for explaining an automotive transmission according to an exemplary embodiment of the present invention.

Figure 2:
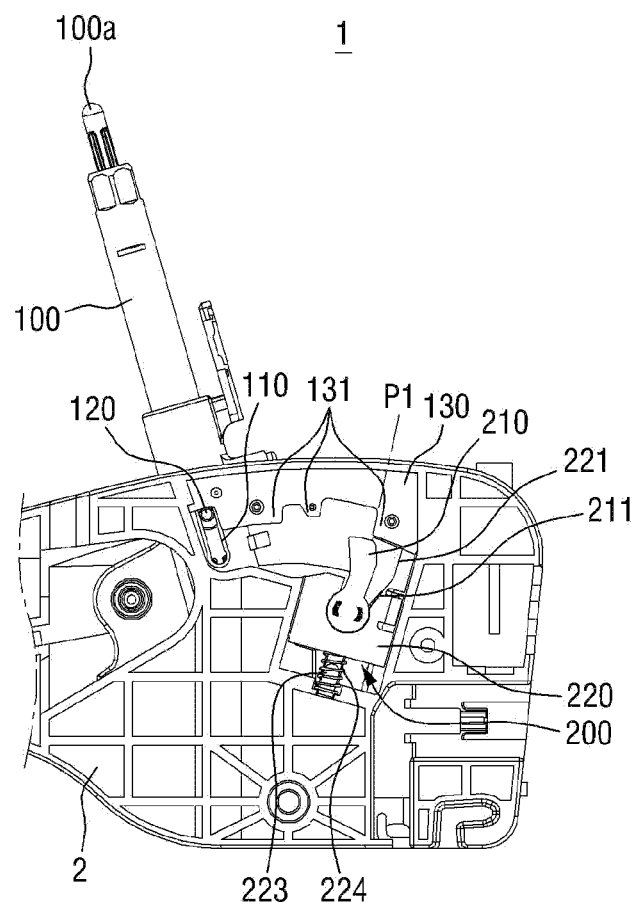
FIG. 2 is an exemplary side view illustrating the automotive transmission according to the exemplary embodiment of the present invention.
Figure 3:
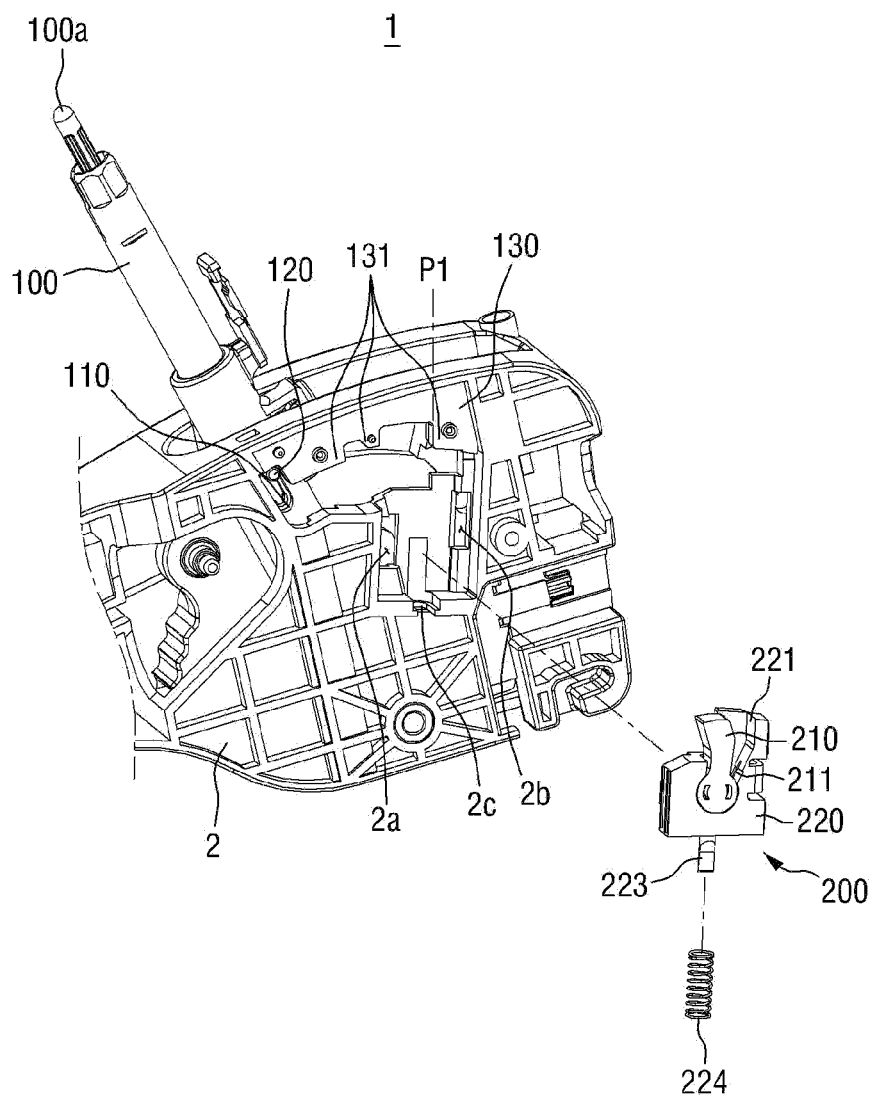
FIG. 3 is an exemplary detailed view illustrating the automotive transmission according to the exemplary embodiment of the present invention.

FIG. 1 is an exemplary view illustrating an automotive transmission according an exemplary embodiment of the present invention, FIG. 2 is an exemplary side view illustrating the automotive transmission according to the exemplary embodiment of the present invention, and FIG. 3 is an exemplary detailed view illustrating the automotive transmission according to the exemplary embodiment of the present invention.

As illustrated, an automotive transmission 1 according to an exemplary embodiment of the present invention may include a shift lever 100 configured to move in one direction to select a gear shifting position, and a movement blocker 200 configured to selectively block movement of the shift lever 100, and the shift lever 100 and the movement blocker 200 may be coupled to a housing 2 to be operated together with various constituent elements used to perform a gear shifting function or a shift lock function.

Figure 4:
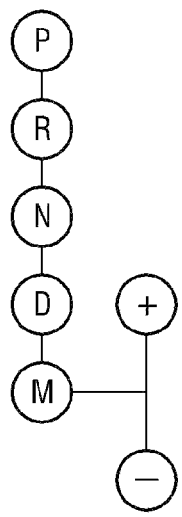
FIG. 4 is an exemplary schematic view illustrating a gear shifting pattern according to the exemplary embodiment of the present invention.

In the exemplary embodiment of the present invention, the automotive transmission 1 may support two or more gear shifting modes that have a gear shifting pattern as illustrated in FIG. 4, and an example is described in which the automotive transmission 1 supports an automatic gear shifting mode and a manual gear shifting mode, but this example is merely for better understanding of the present invention, the present invention is not limited thereto, and the gear shifting mode and the gear shifting pattern, which are supported by the automotive transmission 1, may be variously changed.

When the automotive transmission 1 is in the automatic gear shifting mode, selectable gear shifting positions may include a parking position (P-position), a reverse position (R-position), a neutral position (N-position), and a drive position (D-position), when the automotive transmission 1 is in the manual gear shifting mode, selectable gear shifting positions may include a '+' position, and a '−' position, and as a gear shifting position (hereinafter, referred to as "conversion gear shifting position") that converts the gear shifting mode from the automatic gear shifting mode to the manual gear shifting mode, a manual position (M-position) may be included.

In particular, in the automatic gear shifting mode, the gear shifting position may be selected by moving the shift lever 100 in a vertical direction based on FIG. 4, however, since the M-position is positioned on a movement path of the shift lever 100 in the automatic gear shifting mode, the M-position may be frequently selected due to an erroneous operation of a driver. In other words, when the gear shifting positions are arranged in the order of the P-position, the R-position, the N-position, the D-position, and the M-position, as illustrated in FIG. 4, the driver may intend to select the D-position, but the M-position may be selected due to an erroneous operation of the driver. Therefore, in the exemplary embodiment of the present invention, to prevent the conversion gear shifting position (e.g., the M-position) from being selected due to an erroneous operation of the driver, the movement of the shift lever 100 may be selectively blocked, and a detailed description thereof will be described below.

The shift lever 100 may be moved in one direction to select the gear shifting position, and the shift lever 100 may include a moving member 120 that is moved along a guide groove 110 formed in a long axis direction of the shift lever 100. The moving member 120 may be connected to a release button 100a formed on one end of the shift lever 100 to release movement constraint of the shift lever 100, and when the driver intends to move the shift lever 100 to select the gear shifting position, the moving member 120 may be moved along the guide groove 110 when the driver pushes the release button 100a, and the moving member 120 may be restored to the original position when the driver releases the release button 100a.

Figure 5:
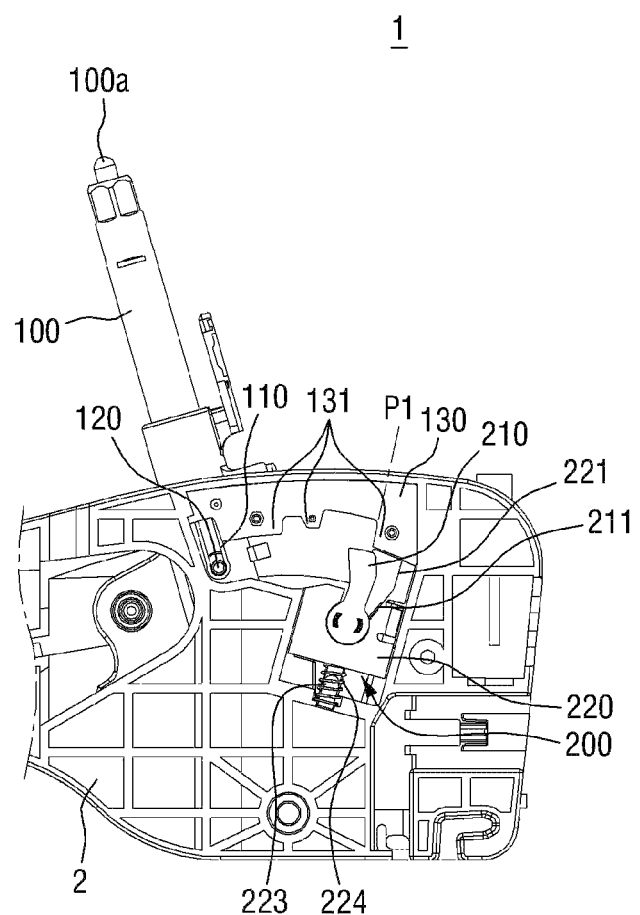
FIGS. 5 to 7 are exemplary side views illustrating a process in which a gear shifting position of the automotive transmission according to the exemplary embodiment of the present invention is selected.
Figure 6:
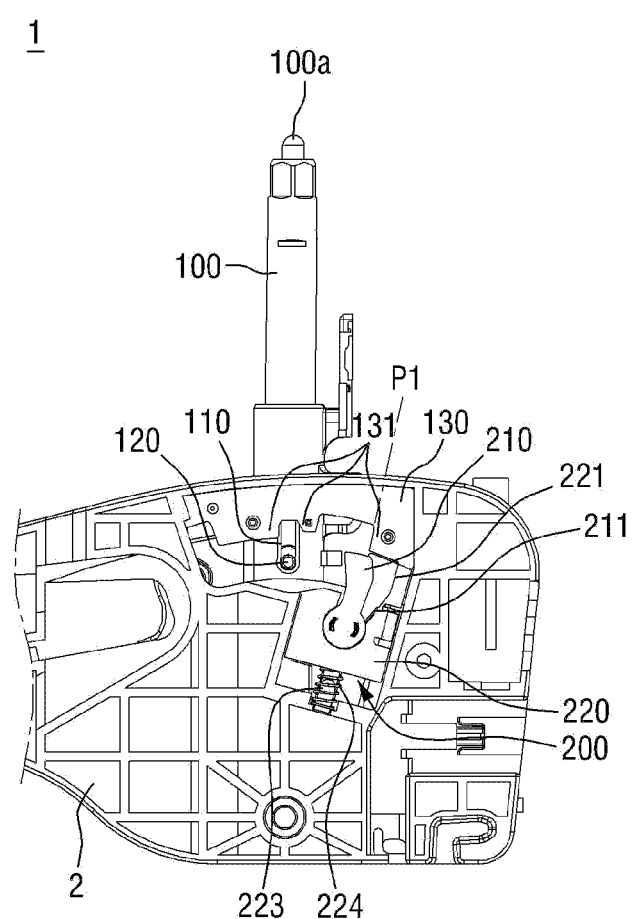
Figure 7:
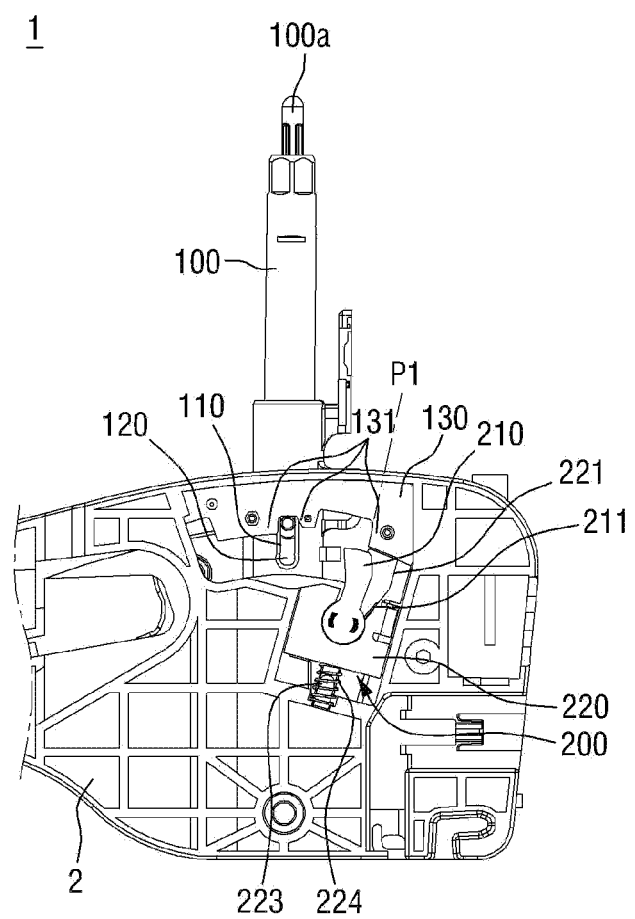

A plate 130, which has a pattern based on the gear shifting position selected by the shift lever 100, may be formed at one side of the shift lever 100. The plate 130 may have a plurality of protruding portions 131 formed based on the gear shifting position and the movement constraint of the shift lever 100 may be released by moving the moving member 120 to one side of the guide groove 110 by pushing the release button 100a to allow the moving member 120 to cross the protruding portions 131. When the release button 100a is released after completing selection of the gear shifting position, the shift lever 110 may be prevented from being moved to other gear shifting positions by the protruding portions 131 formed at one side or both sides of the moving member 120 restored to the original position. In particular, the plurality of protruding portions 131 may be formed for each gear shifting position, or formed for every two or more gear shifting positions. In other words, to move the shift lever 100, the driver may push the release button 100a to move the moving member 120 to one side of the guide groove 110, for example, in a lower direction, as illustrated in FIG. 5, and then when the driver releases the release button 100a after moving the shift lever 100 in one direction, as illustrated in FIG. 6, another gear shifting position may be selected as illustrated in FIG. 7. Specifically, FIGS. 5 to 7 illustrate an example in which the R-position is selected from the P-position in the automatic gear shifting mode, and the same method may be applied to the selection of other gear shifting positions. The driver may select other gear shifting positions by moving the shift lever 100 to pass through two or more gear shifting positions after pushing the release button 100a of the shift lever 100, and the position where the moving member 120 is restored to the original position when the driver releases the release button 100a may be understood as the gear shifting position selected at present.

In particular, as described above, when the automotive transmission 1 supports two or more gear shifting modes, the shift lever 100 may be moved to the conversion gear shifting position, which is provided to convert the gear shifting mode, due to an erroneous operation of the driver, but in the exemplary embodiment of the present invention, the movement blocker 200 may be configured to selectively block the movement of the shift lever 100, to prevent the conversion gear shifting position from being selected due to an erroneous operation of the driver.

The movement blocker 200 may include a rotating member 210 which may be rotated in one direction by a collision with the moving member 120 when the shift lever 100 is moved when the moving member 120 connected to the shift lever 100 is moved to one side of the guide groove 110, that is, when the release button 100a of the shift lever 100 is pushed.

In addition, the movement blocker 200 may include a support member 220 to which the rotating member 210 may be rotatably connected.

Hereinafter, in the exemplary embodiment of the present invention, a direction in which the shift lever is moved to select the gear shifting position is referred to as a first direction, and a direction in which the moving member 120 is moved along the guide groove 110 is referred to as a second direction.

The rotating member 210 may be formed to protrude from one side of the support member 220 at a predetermined interval, and a position of the one side of the support member 220 where the rotating member 210 protrudes may be aligned with a point P1 at the aforementioned plate 130 where the conversion gear shifting position begins to be selected.

The rotating member 210 may include an elastic member 211 such as a torsion spring, and when a force applied due to the collision with the moving member 120 is removed, the rotating member 210 may be restored to an original position, and a restriction surface 221, that restricts a rotational range of the rotating member 210, may be formed on the support member 220 to rotate the rotating member 210 by the moving member 120 to the restriction surface 221. When the rotating member 210 is rotated to the restriction surface 221 due to the collision with the moving member 120, one side of the rotating member 210, which is adjacent to the moving member 120, may be positioned at about the same position as one side of the support member 220 or positioned inside the support member 220 such that as the moving member 120 comes into contact with the one side of the support member 220, thereby preventing the shift lever 100, which is moved in the first direction, from moving further.

Figure 8:
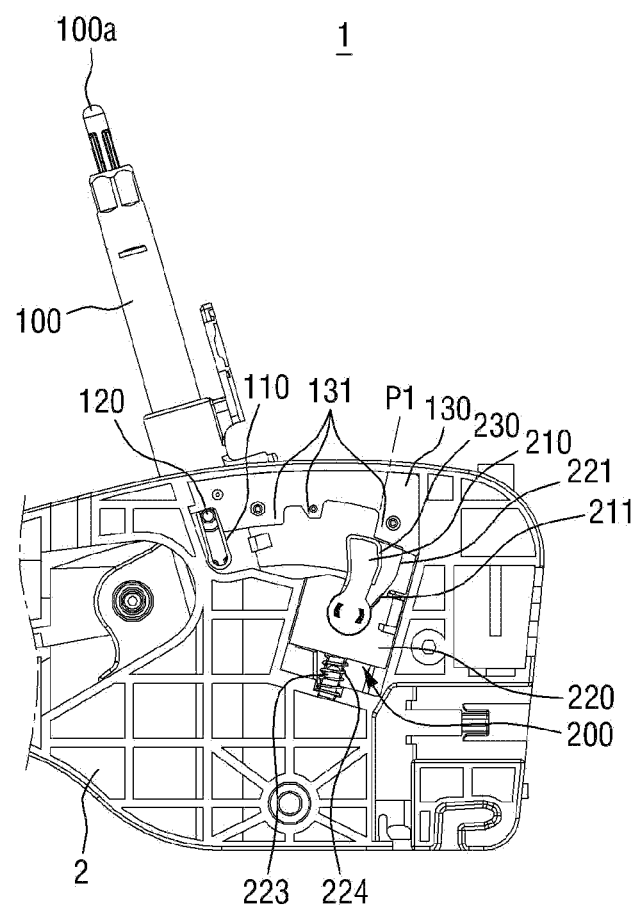
FIG. 8 is an exemplary side view illustrating an automotive transmission according to another exemplary embodiment of the present invention.

Moreover, in the exemplary embodiment of the present invention, an example is described in which the moving member 120 comes into contact with the one side of the support member 220 to block the movement of the shift lever 100, but this example is merely for better understanding of the present invention, the present invention is not limited thereto, and as illustrated in FIG. 8, when the rotating member 210 is moved to the restriction surface 221, the one side of the rotating member 210, which is adjacent to the moving member 120, may be maintained to protrude further than the one side of the support member 220 at a predetermined interval, thereby blocking the movement of the shift lever 100 by the rotating member 210. In particular, as illustrated in FIG. 8, since the rotating member 210 comes into contact with the moving member 120 to block the movement of the shift lever 100, a mitigating member 230 such as a rubber, that reduces impact or noise applied to the rotating member 210, may be formed on the one side of the rotating member 210 or the restriction surface 221.

As described above, when the moving member 120 comes into contact with the rotating member 210 or the support member 220 to prevent the shift lever 100 from being moved in the first direction and when the driver releases the release button 100a of the shift lever 100, the moving member 120 may be moved toward the other side of the guide groove 110, that is, in an upper direction, and thus, the force applied to the rotating member 210 may be removed to restore the rotating member 210 to the original position by the elastic member 211.

In particular, when the driver releases the release button 100a as described above, the one side of the support member 220 may be aligned with the point P1 where the moving member 120 is moved in the upper direction. However, since the rotating member 210 protrudes from the one side of the support member 220 at a predetermined interval, when the driver pushes the release button 100a again, the moving member 120 may collide with the rotating member 210 and apply force to the rotating member 210 from the second direction, that is, from a direction vertical to a rotational direction of the rotating member 210, and therefore the rotating member 210 may not be rotated, but the support member 220 connected to the rotating member 210 may be moved in the second direction causing the shift lever 100 to be movable, thereby making it possible to select the conversion gear shifting position as described above.

In addition, when the driver releases the release button 100a of the shift lever 100 after completing the selection of the conversion gear shifting position, the moving member 120 may be restored to a portion where the moving member 120 is stopped by the plate 130, and simultaneously, the support member 220 may apply force to the moving member 120 by an elastic member 224 of the support member 220, to prevent the moving member 120 from being moved away from the position of the conversion gear shifting position or preventing the shift lever 100 from being shaken.

Figure 9:
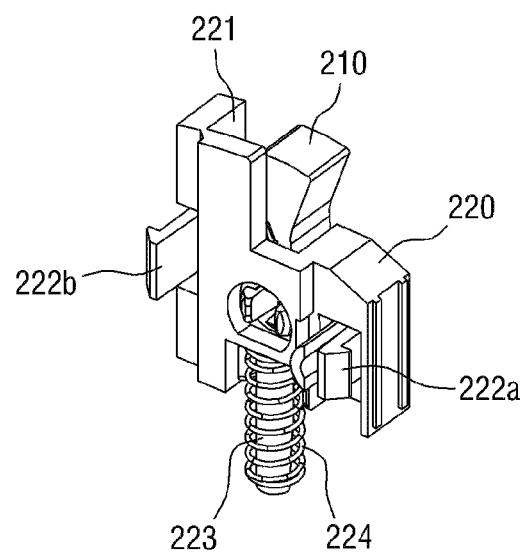
FIG. 9 is an exemplary view illustrating a movement blocker according to the exemplary embodiment of the present invention.

As illustrated in FIG. 9, insertion protrusions 222a and 222b may be formed at one side of the support member 220, and the insertion protrusions 222a and 222b may be inserted into insertion grooves 2a and 2b formed in the housing 2, as illustrated in FIG. 3, to be coupled to be movable in one direction. In particular, the rotating member 210 may also be rotatably connected to the support member 220 to move the rotating member 210 when the support member 220 is moved in the second direction. The number or the position of the insertion protrusions 222a and 222b, and the insertion grooves 2a and 2b may be variously changed.

A guide protrusion 223, which guides the movement of the support member 220, may be formed on one end of the support member 220, and the guide protrusion 223 may be moved in one direction along a guide groove 2c formed in the housing 2. The elastic member 224 formed around the guide protrusion 223 provides elastic force to the support member 220 to restore the support member 220 to an original position.

FIGS. 10 to 15 are exemplary side views illustrating operations of the automotive transmission according to the exemplary embodiment of the present invention. Specifically, FIGS. 10 to 15 include the gear shifting pattern as illustrated in FIG. 4 and are understood to illustrate operations of the movement blocker 200 when the gear shifting mode is converted from the automatic gear shifting mode to the manual gear shifting mode by selecting the M-position in the automatic gear shifting mode. An example is described in which the rotating member 210 of FIGS. 1 to 3 is used, that is, the moving member 120 may collide with the one side of the support member 220, but even when using the rotating member 210 on which the mitigating member 230 may be formed as illustrated in FIG. 8, an object for blocking the movement of the moving member 120 may be changed from the support member 220 to the rotating member 210, and the overall operation may be performed in the same manner.

Figure 10:
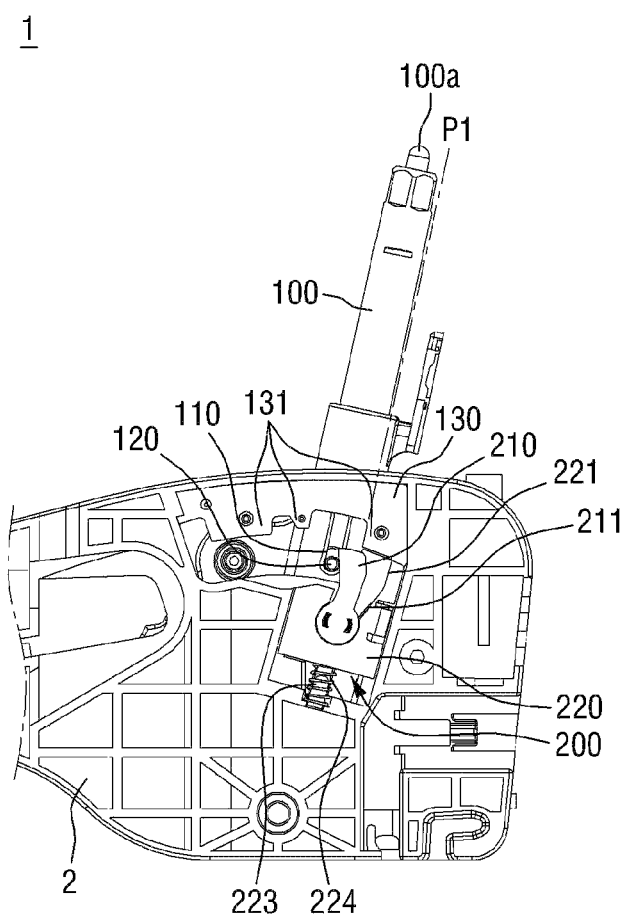
FIGS. 10 to 15 are exemplary side views illustrating a process in which a gear shifting mode is converted in the automotive transmission according to the exemplary embodiment of the present invention.
Figure 11:
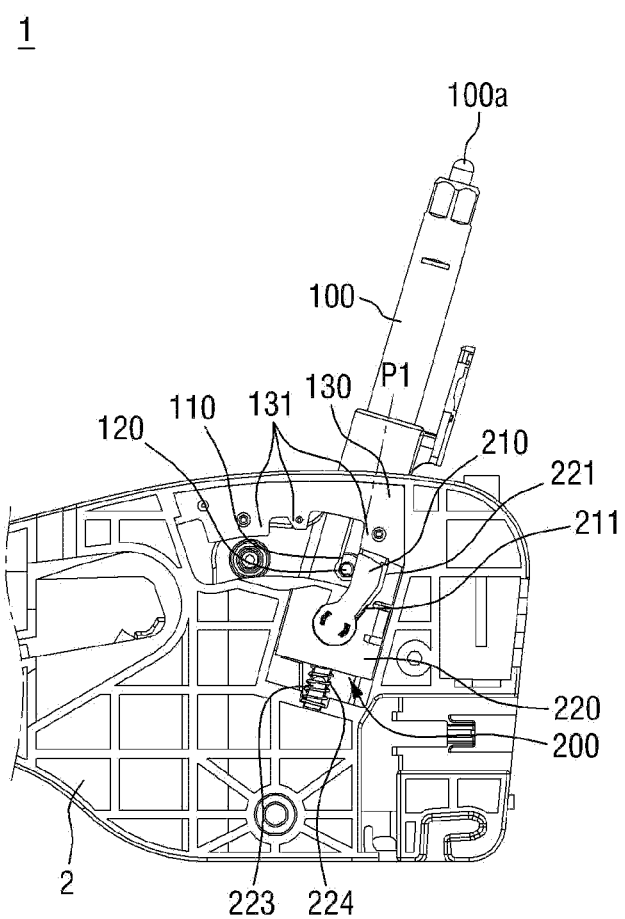

When the driver intends to convert the gear shifting mode, as illustrated in FIG. 10, first, the driver moves the shift lever 100 in the first direction while pushing the release button 100a of the shift lever 100, and then the moving member 120 may be moved to the one side of the guide groove 110, that is, in a lower direction, up to a point where the moving member 120 begins to collide with the rotating member 210. After the state illustrated in FIG. 10, when the shift lever 100 is continuously moved in the first direction, the rotating member 210 may be rotated to the restriction surface 221 by force applied by the moving member 120, as illustrated in FIG. 11, and the moving member 120 may collide with one side of the support member 220, to prevent the shift lever 100 from being moved further in the first direction.

Figure 12:
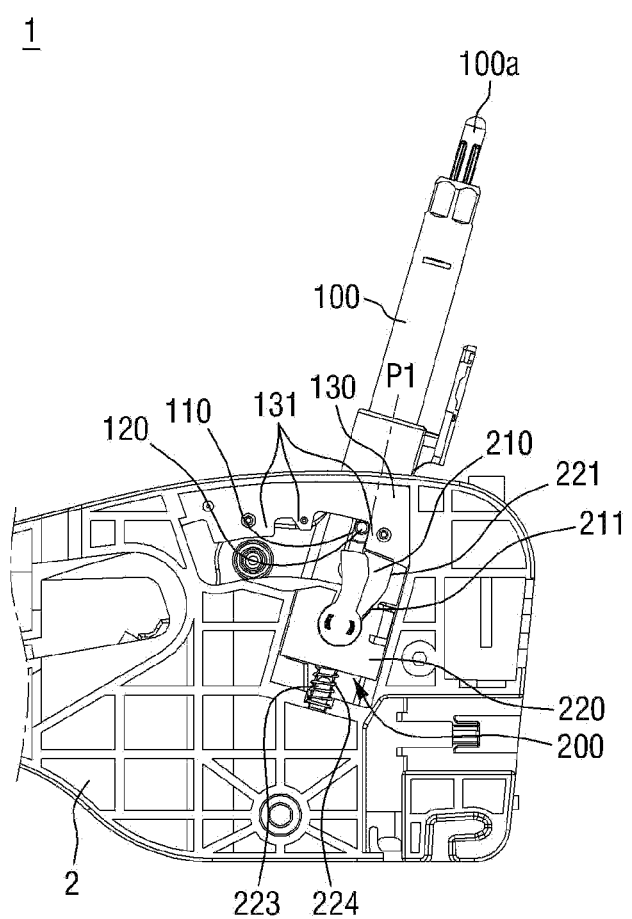
Figure 13:
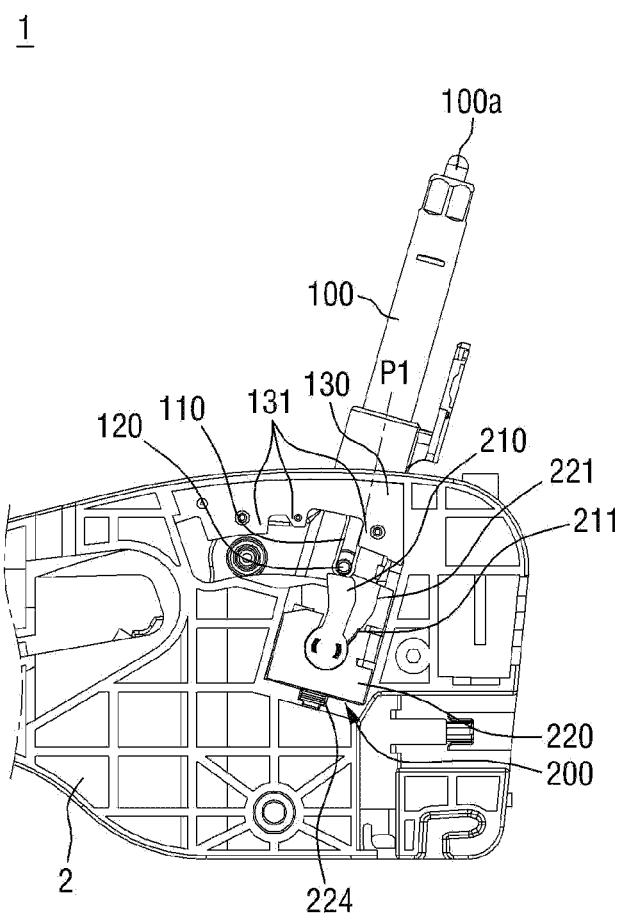

When the driver releases the release button 100a at the point P1 where the shift lever 100 is blocked from being moved in the first direction by the support member 220, that is, the conversion gear shifting position begins to be selected, the moving member 120 positioned in the lower direction of the guide groove 110 may be moved to the original position, that is, in the upper direction of the guide groove 110, as illustrated in FIG. 12. In addition, the rotating member 210 may be restored to the original position by the elastic member 211 as the force applied by the moving member 120 is removed. In particular, when the driver pushes the release button 100a again, the moving member 120 may be moved in the lower direction of the guide groove 110, that is, in the second direction to apply force to the rotating member 210 in the direction vertical to the rotational direction of the rotating member 210, as illustrated in FIG. 13. Further, the support member 220 connected to the rotating member 210 may also be moved in the second direction while the guide protrusion 223 is moved along the guide groove 2c.

Figure 14:
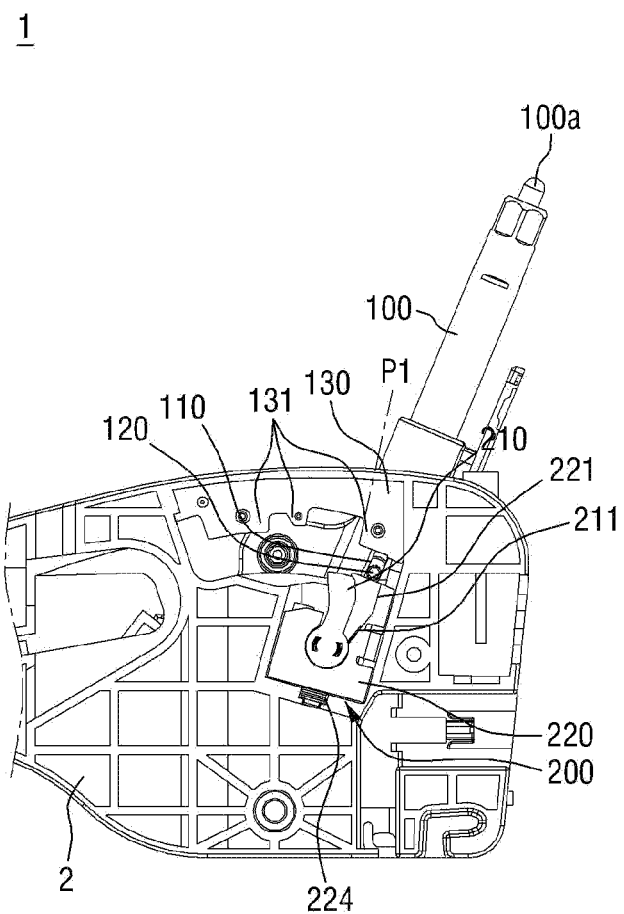
Figure 15:
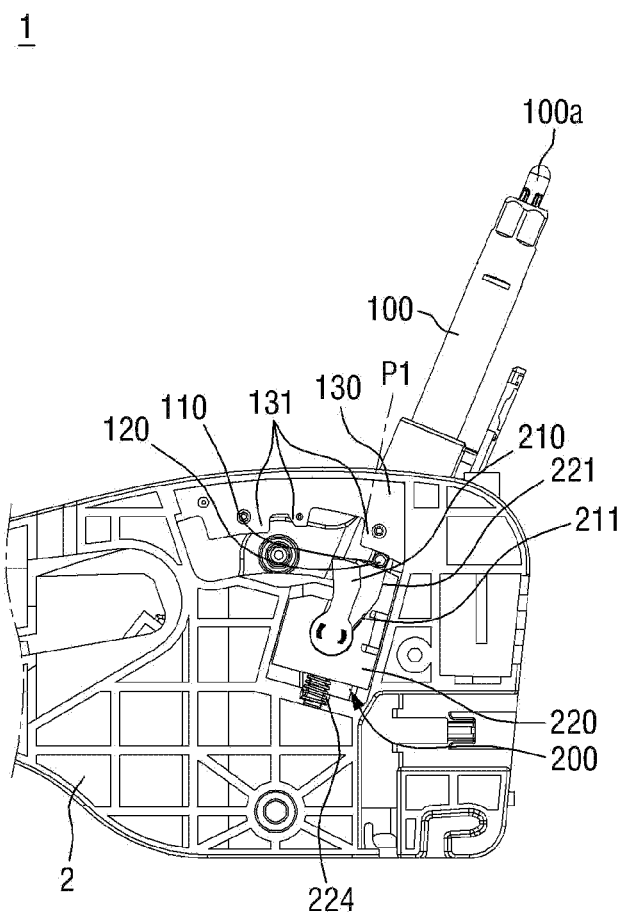

In addition, when the support member 220 is moved in the second direction, the position of the support member 220, which comes into contact with the moving member 120, may change to move the moving member 120 in the first direction. Therefore, as illustrated in FIG. 14, the shift lever 100 may be moved in the first direction to select the conversion gear shifting position. Further, when the driver releases the release button 100a after completing the selection of the conversion gear shifting position using the shift lever 100, the support member 220, which has been moved in the second direction as illustrated in FIG. 15, may also be restored to the original position by the elastic member 224 to apply force to the moving member 120.

The foregoing is illustrative of the present invention and is not to be construed as limiting thereof. Although exemplary embodiments of the present invention have been described, those skilled in the art will readily appreciate that many modifications are possible in the embodiments without materially departing from the novel teachings and advantages of the present invention. Accordingly, all such modifications are intended to be included within the scope of the present invention as defined in the claims. Therefore, it is to be understood that the foregoing is illustrative of the present invention and is not to be construed as limited to the exemplary embodiments disclosed, and that modifications to the disclosed embodiments, as well as other embodiments, are intended to be included within the scope of the accompanying claims. The present invention is defined by the following claims, with equivalents of the claims to be included therein.

What is claimed is:

1. An automotive transmission comprising:
   a shift lever configured to move to select a gear shifting position;
   a moving member configured to move in a vertical direction along a guide groove formed in the shift lever; and
   a movement blocker configured to selectively block the movement of the shift lever based on a position of the moving member,
   wherein the movement blocker includes:
      a rotating member configured to rotate by the moving member and block the movement of the moving member; and
      a support member to which the rotating member is rotatably connected and which is configured to move by the moving member and come into contact with the moving member,
      wherein when the moving member is moved to one side of the guide groove from the other side thereof, the moving member comes into contact with a portion of the rotating member such that force is applied to the rotating member in a vertical direction, and
      wherein the support member is moved in the vertical direction by the force applied to the rotating member to cause the moving member to be moved in a longitudinal direction.

2. The automotive transmission of claim 1, wherein the rotating member is formed to protrude from one side of the support member and is configured to rotate by the moving member in a predetermined rotational range to cause the moving member to come into contact with one side of the support member.

3. The automotive transmission of claim 1, wherein the rotating member is positioned to protrude from one side of the support member and is configured to rotate by the moving member in a predetermined rotational range to block the movement of the moving member.

4. The automotive transmission of claim 3, wherein the rotating member includes a mitigating member formed on one side thereof which is to come into contact with the moving member.

5. The automotive transmission of claim 3, wherein the support member includes a restriction surface that restricts a rotational range of the rotating member.

6. The automotive transmission of claim 1, wherein the rotating member includes an elastic member such that when a force applied due to contact between the moving member with the rotating member or contact between the moving member with the support member is removed, the rotating member can be restored to an original position.

7. The automotive transmission claim 1, wherein when the force applied to the rotating member is removed, the support member is restored to the original position to apply force to the moving member.

8. The automotive transmission of claim 1, wherein the movement blocker is configured to selectively block the selection of the gear shifting position to convert a gear shifting mode between two or more gear shifting modes.

9. An automotive transmission comprising:
   a shift lever configured to move to select shifting position;
   a moving member configured to move in a vertical direction along a guide groove formed in the shift lever; and
   a movement blocker configured to selectively block the movement of the shift lever based on a position of the moving member,
   wherein the movement blocker includes;
      a rotating member configured to rotate by the moving member and block the movement of the moving member; and
   a support member to which the rotating member is rotatably connected and which is configured to move by the moving member and come into contact with the moving member, wherein the support member includes an insertion protrusion inserted into an insertion groove formed in a housing to which the shift lever and the movement blocker are connected.

10. An automotive transmission comprising:
    a shift lever configured to move to select a gear shifting position;
    a moving member configured to move in a vertical direction along a guide groove formed in the shift lever; and
    a movement blocker configured to selectively block the movement of the shift lever based on a position of the moving member,
    wherein the movement blocker includes:
       a rotating member configured to rotate by the moving member and block the movement of the moving member; and
    a support member to which the rotating member is rotatably connected and which is configured to move by the moving member and come into contact with the moving member, wherein the support member includes:
    a guide protrusion inserted into a guide groove formed in a housing to which the shift lever and the movement blocker are connected; and
    an elastic member that provides elastic force to the guide protrusion.

* * * * *